(12) United States Patent
Sniffen

(10) Patent No.: US 12,455,678 B2
(45) Date of Patent: Oct. 28, 2025

(54) PREDICTIVE MODEL FOR COPY-PASTE OPERATIONS

(71) Applicant: Express Scripts Strategic Development, Inc., St. Louis, MO (US)

(72) Inventor: William Sniffen, Plano, TX (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 143 days.

(21) Appl. No.: 18/234,141

(22) Filed: Aug. 15, 2023

(65) Prior Publication Data

US 2025/0060863 A1    Feb. 20, 2025

(51) Int. Cl.
  *G06F 3/0484*    (2022.01)
  *G06F 9/451*    (2018.01)

(52) U.S. Cl.
  CPC ............ *G06F 3/0484* (2013.01); *G06F 9/451* (2018.02)

(58) Field of Classification Search
  CPC ............................... G06F 9/451; G06F 3/0484
  See application file for complete search history.

(56) References Cited

U.S. PATENT DOCUMENTS

| | | |
|---|---|---|
| 7,249,128 B2 | 7/2007 | Chess |
| 8,249,344 B2 | 8/2012 | Viola |
| 9,218,499 B2 | 12/2015 | Furuichi |
| 9,733,902 B2 | 8/2017 | Northrup |
| 9,910,588 B2 | 3/2018 | Pasquero |
| 10,162,319 B2 | 12/2018 | Klein |
| 10,437,428 B2 | 10/2019 | Callaghan |
| 10,614,163 B2 | 4/2020 | Hewitt |
| 10,713,220 B2 | 7/2020 | Netsch |
| 10,929,350 B2 | 2/2021 | Christiansen |
| 11,120,220 B2 | 9/2021 | Chaudhri |
| 2007/0168561 A1 | 7/2007 | Hsu |
| 2007/0226636 A1 | 9/2007 | Carpenter |
| 2014/0047370 A1 | 2/2014 | Moon |
| 2015/0205957 A1 | 7/2015 | Turgeman |
| 2015/0334138 A1 | 11/2015 | Conklin |
| 2016/0018955 A1 | 1/2016 | Fard |
| 2016/0062564 A1 | 3/2016 | Kim |
| 2018/0067785 A1 | 3/2018 | Crowe |
| 2018/0307387 A1 | 10/2018 | Lee |
| 2021/0064448 A1* | 3/2021 | Kochura ............. G06F 3/04842 |
| 2022/0357977 A1* | 11/2022 | Kalou ............. G06Q 10/06393 |
| 2025/0053669 A1* | 2/2025 | Soffer .................. G06F 21/606 |

* cited by examiner

*Primary Examiner* — Tadesse Hailu

(57) ABSTRACT

Methods and systems for automating copy-paste operations are provided. The methods and systems generate for display a first graphical user interface (GUI) comprising one or more fields and receive user input associated with the first GUI. The methods and systems, in response to receiving the user input, analyze the one or more fields of the first GUI using a machine learning model to generate one or more copy-paste operations. The methods and systems, in response to receiving the user input, present a prompt on the first GUI comprising the one or more copy-paste operations and automatically copy data displayed in the one or more fields to one or more fields of a database.

20 Claims, 9 Drawing Sheets

400 ⤵

IDENTIFICATION & SET UP SEGMENT —410

412　414　416

LOOKUP SEGMENT - CAREGIVER/DOCTOR/PROVIDER/CLAIM

PRIOR AUTH CREATION SEGMENT

CLAIM ACTION/SELECTION SEGMENT 401　402

PREDICTIVE MODEL FOR COPY-PASTE OPERATIONS

BACKGROUND

Patient medical records are managed in a variety of ways. Different databases are usually maintained and used to generate graphical user interfaces (GUIs). These GUIs are usually used to modify, populate, and/or check various information. The content of these interfaces is usually repetitive and needs to be copied from one place to another to effectively manage patient information.

DETAILED DESCRIPTION

Figure 1:
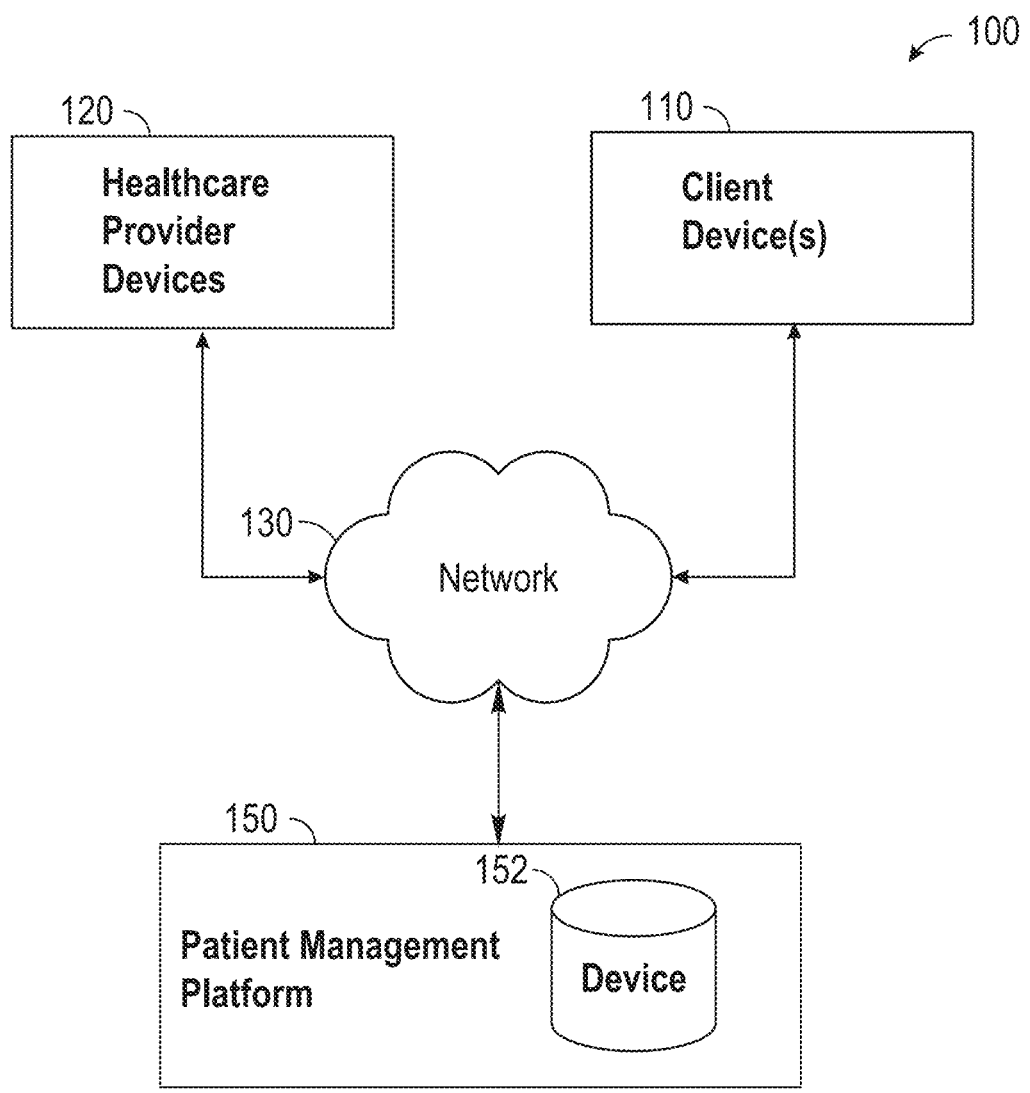
FIG. 1 is a block diagram of an example patient management platform, according to some examples.

Example methods and systems for a patient management platform are provided. Specifically, the methods and systems provide recommendations for copy-paste operations to perform in association with managing GUIs for one or more patients and their respective information. In the following description, for purposes of explanation, numerous specific details are set forth in order to provide a thorough understanding of the examples. It will be evident, however, to one of ordinary skill in the art that examples of the disclosure may be practiced without these specific details.

Managing patient information is usually performed on a backend by way of navigation through various GUIs. Namely, patient information is usually dispersed throughout a variety of databases and is accessed through individual systems and/or GUIs that are configured to access the information from the databases. Managing patient information is usually incredibly complex and takes a great deal of time. Such management is usually also prone to human errors. These errors usually arise and result from manual performance of operations associated with retyping the data or copying or moving data from one database (e.g., by accessing a first GUI) to another database (e.g., by accessing another GUI). Particularly, users (e.g., patient information managers or processors) need to select a particular set of patient information to copy and then select one or more target locations in another GUI in which to paste the information. Pasting or moving the information to the wrong location can be detrimental and can result in many errors and issues. Also, the process of constantly moving data from one place to another involves navigation through various pages of information (e.g., maximizing a window or frame and minimizing a window or frame) and is incredibly time consuming. This may create errors or inefficiencies in operation.

Typical systems fail to provide a single application that automates the process of moving information (e.g., patient information) from one database to another. Typical systems further fail to provide a single application that suggests autonomous tasks to perform into a single user interface. As a result, users are burdened with having to navigate multiple pages of information and repeatedly inputting information to manage patient information. This wastes a great deal of time and resources that can be devoted to other tasks.

The disclosed techniques provide systems and methods to automate moving data, e.g., using copy-paste operations. The disclosed techniques generate for display a first GUI that includes one or more fields and receive user input associated with the first GUI. The disclosed techniques, in response to receiving the user input, analyze the one or more fields of the first GUI using a machine learning model (e.g., an artificial neural network) to generate one or more copy-paste operations. The disclosed techniques, in response to receiving the user input, present a prompt on the first GUI that includes the one or more copy-paste operations (e.g., including options representing the copy-paste operations) and automatically copy data displayed in the one or more fields to one or more fields of a database (associated with the same first GUI or a second GUI).

In some cases, the disclosed techniques also present one or more automation operation options associated with the one or more context sensitive automation operations together with the one or more copy-paste operations in the prompt. This allows the user to also perform automated operations after and/or before one or more copy-paste operations are automatically performed. The one or more context sensitive automation operations can include at least one of a compare text of two fields operation, a mathematical computation operation for data in the one or more fields of the first GUI, and/or verifying visual contents of the first GUI.

As a result, a great deal of time and resources are saved and the user need not have to navigate through a multitude of pages of information to manage patient information or repeat input of medical information. This saves time and reduces the amount of resources needed to accomplish a task.

FIG. 1 is a block diagram showing an example patient management system 100, according to some examples. The patient management system 100 includes one or more client devices 110, one or more healthcare provider devices 120, and a patient management platform 150 that are communicatively coupled over a network 130 (e.g., Internet, telephony network).

As used herein, the term "client device" may refer to any machine that interfaces to a communications network (such as network 130) to access the patient management platform 150. The client device 110 may be, but is not limited to, a mobile phone, desktop computer, laptop, portable digital assistants (PDAs), smart phones, a wearable device (e.g., a smart watch), tablets, ultrabooks, netbooks, laptops, multi-processor systems, microprocessor-based or programmable consumer electronics, game consoles, set-top boxes, or any other communication device that a user may use to access a network or the patient management platform 150.

In some cases, the patient management platform 150 is accessible over a global communication system, e.g., the Internet or world wide web. In such instances, the patient management platform 150 hosts a website that is accessible to the client devices 110. Upon accessing the website, the client devices 110 provide secure login credentials, which are used to access a profile associated with the login credentials and one or more patient profiles or patient information. As used herein, patient information includes any medical information associated with a patient including one or more prior medical insurance claims that were approved or denied, one or more electronic health records or medical health records, patient health information, patient demographic information, prior bloodwork results, prior results of non-bloodwork tests, medical history, medical provider notes in the electronic health record, intake forms completed by the patient, patient in-network insurance coverage, patient out-of-network insurance coverage, patient location, and/or one or more treatment preferences. One or more user interfaces associated with the patient management platform 150 are provided over the Internet via the website to the client devices 110. The user interfaces may include set locations or fixed locations whereat it displays the patient data.

Healthcare provider devices 120 can include the same or similar functionality as client devices 110 for accessing the patient management platform 150. In some cases, the healthcare provider devices 120 are used by "internal" users. Internal users are medical professionals, such as medical personnel, physicians, clinicians, healthcare providers, health-related coaches pharmacy benefit manager (PBM) operators, pharmacists, specialty pharmacy operators or pharmacists, or the like that are associated with, certified by, or employed by one or more organizations that provides the patient management platform 150. In some cases, the healthcare provider devices 120 are used by "external" users. External users are medical professionals and personnel, such as physicians, clinicians, and health-related coaches that are associated with or employed by a different (external) organization than that which provides the patient management platform 150.

The healthcare provider devices 120, when used by internal or external users, to access the patient management platform 150 can view many records associated with many different patients (or users associated with client devices 110) and their respective patient information. Different levels of authorization can be associated with different internal and different external users to control which records the internal and external users have access. In some instances, only records associated with those patients to which a given internal or external user is referred, are made accessible and available to the given internal or external user device. Sometimes, a first internal or external user can refer a patient or records associated with the patient to a second internal or external user. In such circumstances, the second internal or external user becomes automatically authorized to access and view the patient's records that were referred by the first internal or external user. The user interfaces on the healthcare provider devices 120 may include set locations or fixed locations whereat it displays the patient data.

In some examples, the patient management platform 150 (and specifically the medical testing recommendation system 156) can implement a machine learning technique or machine learning model, such as a neural network (discussed below in connection with FIG. 9). The patient management platform 150 can use the machine learning model to simplify and expedite the management of patient information. Particularly, the patient management platform 150 can be accessed by the healthcare provider devices 120. The healthcare provider devices 120 can navigate multiple GUIs each associated with a different database of patient information to verify patient records information and to move data from one GUI or database to another. The process of moving data can be repetitive and tedious as information is usually copied and repeated across various databases, through multiple GUIs. To improve the accuracy and efficiency at which data is moved and managed across the various GUIs and databases, the patient management platform 150 can process or analyze data fields of a first GUI using the machine learning model. The machine learning model can generate a set of copy-paste operations that are associated with the first GUI. The predictive copy-paste machine learning model can learn where on a first GUI, e.g., the location of a field, information is copied. The predictive copy-paste machine learning model can learn where on a first GUI, e.g., the location of the field, information is pasted. These copy-paste operations can be presented in a prompt to a user, such as in response to specific user input (e.g., activating or pressing a right button on a mouse). The patient management platform 150 can receive input that selects an individual copy-paste operation from the prompt. In response, the patient management platform 150 can execute the individual copy-paste operation by copying the data from one or more fields of the first GUI into one or more target fields of a second GUI or a database associated with the first GUI or second GUI.

Specifically, the machine learning model can be trained to establish a relationship between a plurality of training GUIs and ground-truth copy-paste operations performed in association with the training GUIs. The ground-truth copy-paste operations can be the actual operations performed by users in copying and pasting the information from specific fields in the GUIs. The ground-truth copy-paste operation location can be different locations on different displays when running a same program relative to another display. The machine learning model can then receive a new GUI and can estimate or predict one or more copy-paste operations that can be performed in association with the new GUI (e.g., based on past interactions with the same GUI or another GUI that has similar features or fields). This allows the operator or processor accessing the information, e.g., patient information, a more efficient and effective and accurate way to enter and manage the information. This reduces the number of times information needs to be repetitively copied, improves the overall accuracy of managing patient information, and reduces the number of pages of information and interfaces the operator has to navigate through to manage patient information.

In an example, the machine learning model can be trained by obtaining a batch of training data comprising a first set of the plurality of training GUIs associated with a first set of ground-truth copy-paste operations performed in association with the first set of the plurality of training GUIs. The machine learning model process the first set of the plurality of training GUIs by the machine learning model to generate an estimated set of copy-paste operations. The machine learning model can compute a loss based on a deviation between the estimated set of copy-paste operations and the first set of ground-truth copy-paste operations and update one or more parameters of the machine learning model based on the computed loss.

In some examples, the machine learning model is further trained by obtaining a second batch of training data comprising a second set of the plurality of training GUIs associated with a second set of ground-truth copy-paste operations performed in association with the first set of the plurality of training GUIs. The machine learning model processes the second set of the plurality of training GUIs (e.g., features of the second set) to generate a second estimated set of copy-paste operations. The machine learning model computes a second loss based on a deviation between the second estimated set with the second set of ground-truth copy-paste operations and updates the one or more parameters of the machine learning model based on the computed second loss. These training operations can be repeated for multiple batches of training data and/or until a stopping criterion is reached.

The present system further provides the advantage that the system can be closed and not part of an open architecture and the information may be sensitive or regulated. The sensing of the ground-truth copy-paste operations and generation of the predictive model can be internal within a protected environment and not monitored by or copied to a publicly open machine learning system. This assists in protecting the subject's information (e.g., health, financial, personal or the like) per se and how the subject's information is being used between GUIs.

In some examples, the patient management platform 150 (e.g., using the database 152) generates for display a first GUI including one or more fields. The patient management platform 150 receives user input associated with the first GUI. The patient management platform 150, in response to receiving the user input, analyzes the one or more fields of the first GUI using the machine learning model to generate one or more copy-paste operations and presents a prompt on the first GUI including the one or more copy-paste operations. The patient management platform 150, in response to receiving a selection of a first copy-paste operation from the one or more copy-paste operations, automatically copies data displayed in the one or more fields to one or more fields of a database. In an example, the predictive model presents the most likely location for a copy function. In the case of multiple possible copy locations, e.g., multiple fields are copied from in the first GUI, the predictive model can select the most likely copy from field or location. In an example, the predictive model further determines the most likely order of suggested copy fields or location on the first GUI.

In some examples, the patient management platform 150 generates for display a second GUI including an individual field associated with the one or more fields of the database to which the data has been copied. The patient management platform 150, automatically populates the individual field of the second GUI with the data displayed in the one or more fields of the first GUI. In some examples, the patient management platform 150, in response to receiving the selection of the first copy-paste operation, automatically copies the data displayed in a first of the one or more fields of the first GUI to automatically populate a second field of the one or more fields of the first GUI. In an example, a single second field to receive the information or multiple second fields to receive the information is linked to one first field.

In some examples, the selection of the first copy-paste operation includes activation of a single displayed option associated with the first copy-paste operation. In some cases, the user input includes activation of a right mouse button. In some examples, the prompt includes a plurality of copy-paste options each associated with a respective one of a plurality of copy-paste operations including the one or more copy-paste operations.

In some examples, the patient management platform 150 receives a first input that causes a first copy-paste option of the plurality of copy-paste options to be highlighted (or selected). The patient management platform 150, in response to receiving the first input, visually indicates a first field of the one or more fields of the first GUI from which target data is copied and pasted as a result of additional input that selects the first copy-paste option. In some examples, the patient management platform 150 receives a second input that causes a second copy-paste option of the plurality of copy-paste options to be highlighted (or selected). The patient management platform 150, in response to receiving the second input after the first input, visually indicates a second field of the one or more fields of the first GUI instead of the first field. The second field can be visually indicated to specify alternative target data to be copied and pasted as a result of additional input that selects the second copy-paste option.

In some examples, visually indicating the first field includes replacing a cursor icon with a target icon (or other icon different than the default pointer icon) over a region of the first GUI in which the target data of the first field is presented. In some examples, the patient management platform 150 receives the additional input that selects the first copy-paste option. The patient management platform 150, in response to receiving the additional input, modifies a display attribute of the first copy-paste option to indicate whether the copy-paste operation associated with the first copy-paste option was successfully automatically performed. For example, a color of the first copy-paste option can be set to a first color in response to determining that the copy-paste operation associated with the first copy-paste option was successfully automatically performed and the color of the first copy-paste option can be set to a second color in response to determining that the copy-paste operation associated with the first copy-paste option was unsuccessfully automatically performed.

In some examples, the patient management platform 150 generates one or more context sensitive automation operations associated with the one or more fields. The patient management platform 150 presents one or more automation operation options associated with the one or more context sensitive automation operations together with the one or more copy-paste operations in the prompt. In some examples, the one or more context sensitive automation operations are generated based on the first copy-paste operation that is selected.

In some examples, the patient management platform 150 activates a first of the one or more context sensitive automation in response to receiving input that selects a corresponding first of the one or more automation operation options. The patient management platform 150 presents a visual indicator representing a result of performing the first of the one or more context sensitive automation in the corresponding first of the one or more automation operation options. For example, the one or more context sensitive automation operations can include at least one of a compare text of two fields operation, a mathematical computation operation for data in the one or more fields of the first GUI, and/or verifying visual contents of the first GUI. The one or more context sensitive automation operations can be automatically generated or can be user defined and specific to an individual user.

The network 130 may include, or operate in conjunction with, an ad hoc network, an intranet, an extranet, a virtual private network (VPN), a local area network (LAN), a wireless network, a low energy Bluetooth (BLE) connection, a WiFi direct connection, a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The healthcare provider devices 120 can be used to access pharmacy claims, medical data (e.g., medical information 230 stored in database 152), laboratory data and the like for one or more patients that the healthcare provider devices 120 are authorized to view. This patient information 210 can be maintained in a database 152 by the patient management platform 150 or in a third-party database accessible to the patient management platform 150 and/or the healthcare provider devices 120.

In some examples, the client devices 110 and the patient management platform 150 can be communicatively coupled via an audio call (e.g., VOIP, Public Switched Telephone Network, cellular communication network, etc.) or via electronic messages (e.g., online chat, instant messaging, text messaging, email, and the like). While FIG. 1 illustrates a single client device 110 and a single healthcare provider device 120, it is understood that a plurality of such devices can be included in the system 100 in other embodiments.

Figure 2:
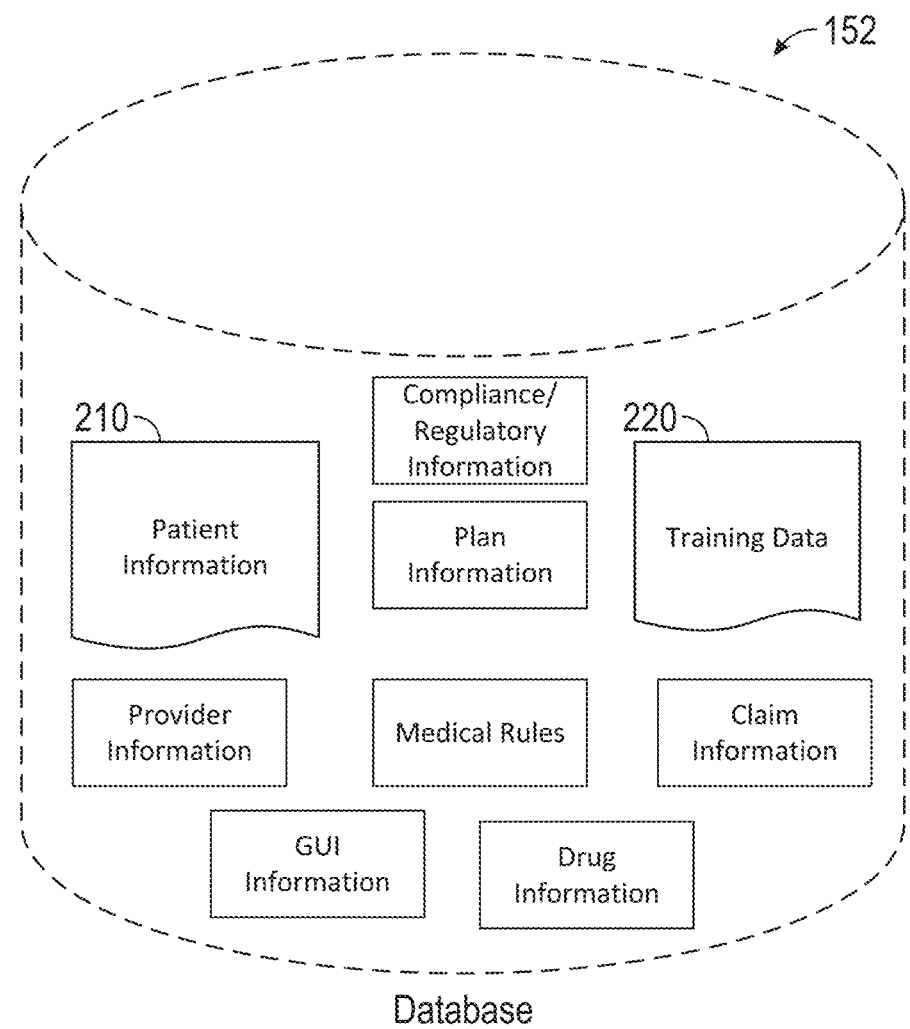
FIG. 2 is an example database that may be deployed within the system of FIG. 1, according to some examples.

FIG. 2 is an example database 152 that may be deployed within the system of FIG. 1, according to some examples. The database 152 includes patient information 210 and training data 220. The patient information 210 can be generated or accessed by the patient management platform 150. For example, the patient management platform 150 can access one or more patient records from one or more sources, including pharmacy claims, benefit information, prescribing physician information, dispensing information (e.g., where and how the patient obtains their current medications), demographic information, prescription information including dose quantity and interval, and input from a patient received via a user interface presented on the client device 110 and so forth. The patient management platform 150 can collect this information from the patient records and generates a patient features vector that includes this information.

The training data 220 includes training sets including multiple sets of a plurality of training GUIs associated with a respective sets of ground-truth copy-paste operations performed in association with the multiple sets of the plurality of training GUIs. The training data 220 is used to train a machine learning model implemented by patient management platform 150 to generate estimates of one or more copy-paste operations to recommend performing in association with a GUI that is presented. For example, the training data 220 can be built over time by analyzing user behavior and interactions with various GUIs. For example, a subset of the set of ground-truth copy-paste operations can be generated in response to detecting a predetermined sequence of user performed copy-paste actions. The predetermined sequence of user performed copy-paste actions can include highlighting (or selecting) a portion of one of the training GUIs, activating a first copy operation, identifying a target portion of one of the training GUIs, and activating a paste operation. The predetermined sequence of user performed copy-paste actions can include identifying a field containing the data to be copied. The predetermined sequence of user performed copy-paste actions can include identifying a cursor location at which the user begins a selection function containing the data to be copied. The predictive model determination engine can also determine if multiple users of the training GUI are selecting the same data, e.g., in a field, even with the user's selecting the data from beginning to end or end to beginning.

In some examples, the patient management platform 150 and/or the healthcare provider devices 120 can be used to generate the training data 220. Specifically, the healthcare provider devices 120 and/or the patient management platform 150 can implement a watcher application that monitors user actions in the background. The patient management platform 150 and/or the healthcare provider devices 120 can determine that a user is currently accessing a GUI. The patient management platform 150 and/or the healthcare provider devices 120 can determine that a highlighting operation (or other selection operation) is being performed in which one or more characters and/or objects are highlighted (or selected) using a cursor on the GUI. In response, the patient management platform 150 and/or the healthcare provider devices 120 can initiate generation of the training data. Particularly, the patient management platform 150 and/or the healthcare provider devices 120 can store an identifier of the GUI and/or placement information defining the area of the GUI in which the field of the GUI is highlighted (or selected). The patient management platform 150 and/or the healthcare provider devices 120 can also identify a corresponding HTML field corresponding to the data that is being highlighted (or selected).

The patient management platform 150 and/or the healthcare provider devices 120 can then determine that a copy operation has been performed (e.g., in response to selecting a copy option from a displayed menu). The patient management platform 150 and/or the healthcare provider devices 120 can then determine that a new GUI is accessed and/or a cursor is positioned over another field of the same GUI or the new GUI. The patient management platform 150 and/or the healthcare provider devices 120 can store the identifier of the GUI and field over which the cursor is positioned. The patient management platform 150 and/or the healthcare provider devices 120 can detect a paste operation (e.g., in response to determining that a paste option is selected from a menu). This can conclude the tracking performed by the patient management platform 150 and/or the healthcare provider devices 120 and the patient management platform 150 and/or the healthcare provider devices 120 can generate a first set of training data that represents the field of the GUI from which the data is copied and the field of the GUI (which can be a new GUI) into which the data is pasted. This data can form the training GUI and the ground-truth copy-paste operations associated with the training GUI. The watcher application can continue monitoring for such predetermined sequences of actions to continue generating the training data until a threshold quantity of training data is collected for a specified GUI or collection of GUIs.

In some examples, the watcher application provides empirical information to a training module of the patient management platform 150. This empirical information can include a date, time, screen identifier (e.g., URL), screen coordinates (both the copy origination and the paste destination coordinates), data selected, user name, device name and/or keyboard actions (Ctrl-C, Ctrl-V) that occur during a manual copy-paste activity. This empirical data is fed to the machine learning models that control the GUI that the user will see. The GUI that is generated, after enough training, can present the user the option to select an automatic copy-paste that has been predicted by the training of the machine learning models using the watcher application/function.

In some cases, the patient management platform 150 and/or the healthcare provider devices 120 can also similarly generate training data 220 that includes context sensitive automation operations. To do so, the patient management platform 150 and/or the healthcare provider devices 120 can receive input from a user that defines automation operations to perform in association with individual GUIs. The patient management platform 150 and/or the healthcare provider devices 120 can also or alternatively define or predict automation operations that are performed when one or more copy-paste operations are performed. Namely, the patient management platform 150 and/or the healthcare provider devices 120 can determine that after a certain copy-paste operation is performed in association with a GUI, the same operation (e.g., comparing data from two fields or verifying data that is entered) is performed by the user. In such cases, the patient management platform 150 and/or the healthcare provider devices 120 associates or generates an automation operation with the certain copy-paste operation to recommend performing the automation operation when the certain copy-paste operation is selected. In some examples, after the automatic copy-paste operation is selected (e.g., after an option is highlighted and selected), the data is copied to the predicted location and an action key (e.g., an ENTER key) is automatically selected to execute an action.

Figure 3:
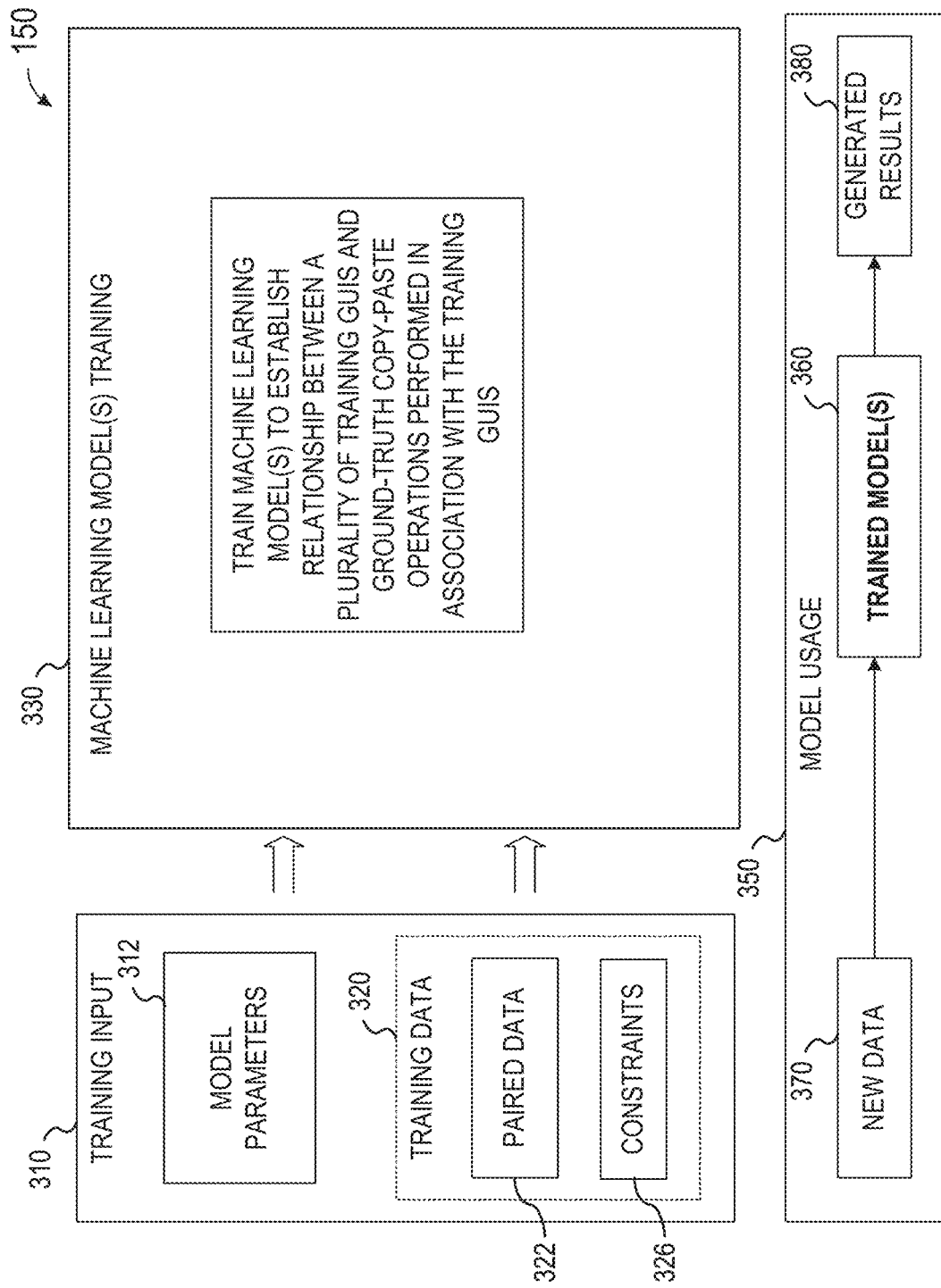
FIG. 3 is a block diagram of an example patient management platform that may be deployed within the system of FIG. 1, according to some examples.

FIG. 3 is a block diagram of an example service of patient management platform 150 that may be deployed within the system of FIG. 1, according to some examples. Training input 310 includes model parameters 312 and training data 320 (e.g., training data 220 (FIG. 2)) which may include paired training data sets 322 (e.g., input-output training pairs) and constraints 326. Model parameters 312 stores or provides the parameters or coefficients of corresponding ones of machine learning models. During training, these parameters 312 are adapted based on the input-output training pairs of the training data sets 322. After the parameters 312 are adapted (after training), the parameters are used by trained models 360 to implement the trained machine learning models on a new set of data 370.

Training data 320 includes constraints 326 which may define the constraints of a given patient information features. The paired training data sets 322 may include sets of input-output pairs, such as pairs of a plurality of training GUI features and features of copy-paste operations that are performed in association with one or more of the training GUIs (e.g., ground-truth copy-paste operations). Some components of training input 310 may be stored separately at a different off-site facility or facilities than other components.

Machine learning model(s) training 330 trains one or more machine learning techniques based on the sets of input-output pairs of paired training data sets 322. For example, the model training 330 may train the machine learning (ML) model parameters 312 by minimizing a loss function based on one or more ground-truth copy-paste operations performed in association with a training GUI. The ML model can include any one or combination of classifiers or neural networks, such as an artificial neural network, a convolutional neural network, an adversarial network, a generative adversarial network, a deep feed forward network, a radial basis network, a recurrent neural network, a long/short term memory network, a gated recurrent unit, an auto encoder, a variational autoencoder, a denoising autoencoder, a sparse autoencoder, a Markov chain, a Hopfield network, a Boltzmann machine, a restricted Boltzmann machine, a deep belief network, a deep convolutional network, a deconvolutional network, a deep convolutional inverse graphics network, a liquid state machine, an extreme learning machine, an echo state network, a deep residual network, a Kohonen network, a support vector machine, a neural Turing machine, and the like.

Particularly, the ML model can be applied to a training batch of GUI features to estimate or generate a prediction of copy-paste operations performed for one or more of the GUIs. In some implementations, a derivative of a loss function is computed based on a comparison of the estimated copy-paste operations and the ground truth copy-paste operations associated with the training GUI features and parameters of the ML model are updated based on the computed derivative of the loss function.

The result of minimizing the loss function for multiple sets of training data trains, adapts, or optimizes the model parameters 312 of the corresponding ML models. In this way, the ML model is trained to establish a relationship between a plurality of training GUIs and ground-truth copy-paste operations performed in association with the training GUIs.

After the machine learning model is trained, new data 370, including one or more GUI features are received and/or derived from a GUI being accessed by the patient management platform 150. The trained machine learning technique may be applied to the new data 370 to generate results 380 including a prediction of one or more copy-paste operations to perform for the GUI. The recommendation can be represented in a GUI, such as in a prompt overlaid on the GUI that depicts each of a plurality of copy-paste operations. In some cases, the prompt is presented in response to a predetermined input, such as a right mouse button selection or activation.

Figure 4:
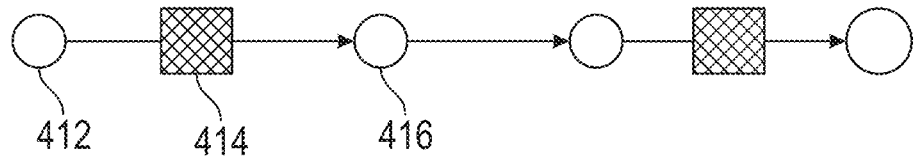
FIG. 4 is a block diagram of an example set of sequences that can be analyzed to generate training data for the patient management platform, according to some examples.
Figure 4:
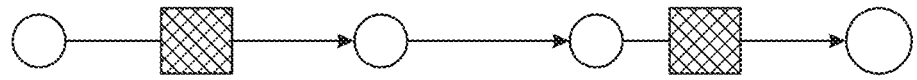
Figure 4:
Figure 4:
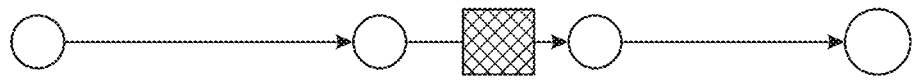
Figure 4:
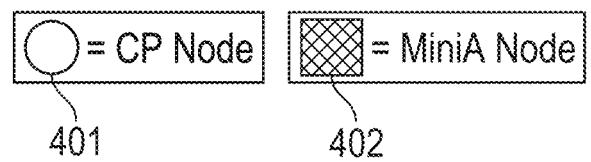

FIG. 4 is a block diagram 400 of an example set of sequences that can be analyzed to generate training data for the patient management platform, according to some examples. For example, the patient management platform 150 can detect a first sequence 410 of copy-paste operations performed by a user and one or more automation operations performed by the user. Specifically, the patient management platform 150 can detect a first copy-paste operation 412 that is performed in association with a first GUI. The patient management platform 150 can store this first copy-paste operation 412 as part of the training data associated with the first GUI. Then, the patient management platform 150 can determine that an automation operation 414 is performed after the first copy-paste operation 412. In such cases, the patient management platform 150 can add to the training data the identification of the automation operation 414 and an indication that the automation operation 414 was performed after the first copy-paste operation 412. The patient management platform 150 can also determine that a second copy-paste operation 416 was performed followed by a third copy-paste operation. This sequence of copy-paste operations and interleaved automation operations can be stored as part of the training data.

Circle elements shown in block diagram 400 can represent copy-paste nodes 401. Square elements shown in the 400 can represent automation operation nodes 402. The patient management platform 150 can analyze various sequences of these operations performed in different GUIs or different portions of the GUI. Using these sequences, the patient management platform 150 can train the model to provide predictive copy-paste operations to perform when certain automation operations are detected or vice-versa.

Figure 5:
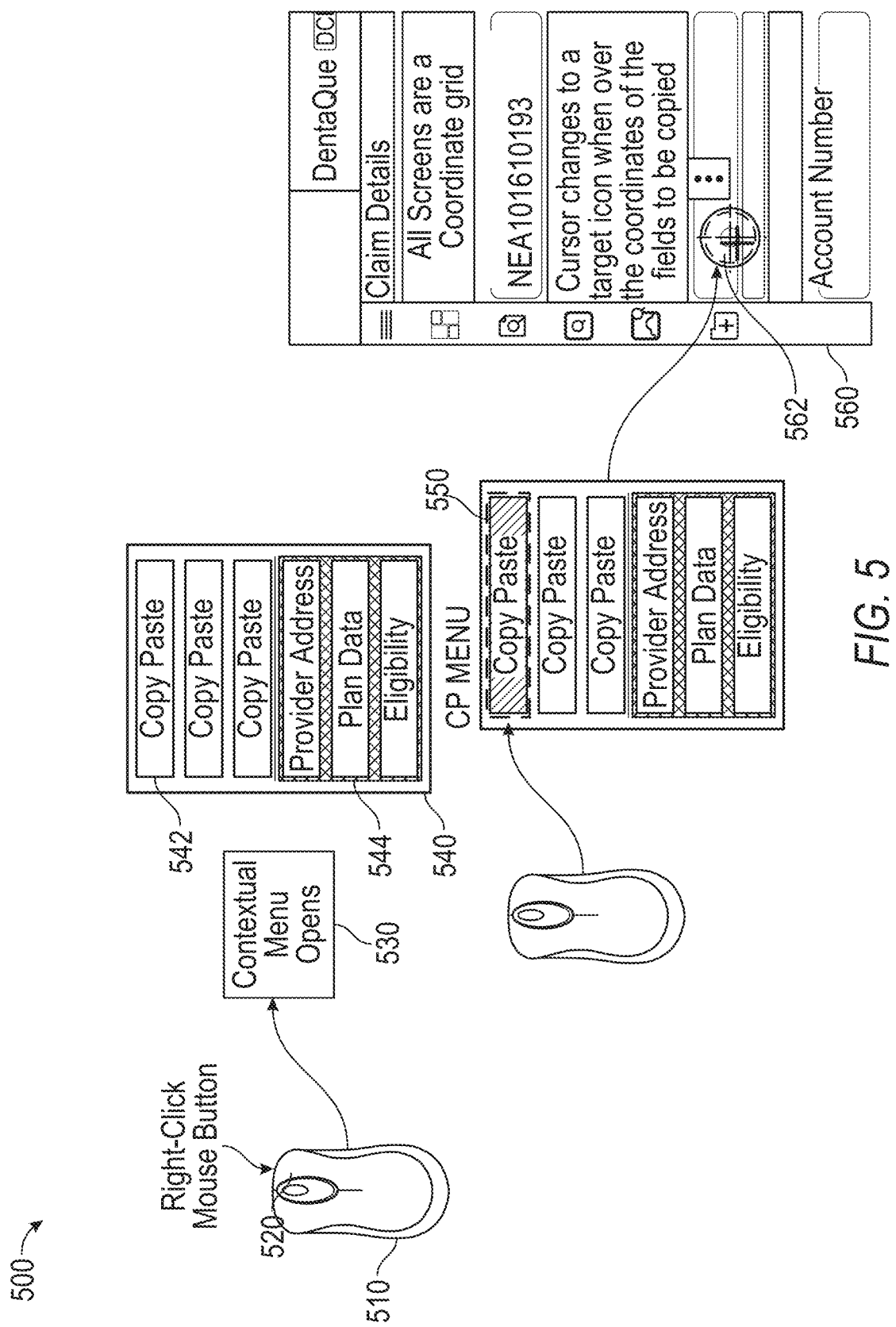
FIG. 5 is an example user interface of the patient management platform, according to some examples.

For example, as shown in FIG. 5 is an example set of user interfaces 500 of the patient management platform 150, according to some examples. For example, a user can initially be accessing a first GUI using the healthcare provider devices 120. While viewing a portion of the first GUI (e.g., including one or more fields of the first GUI), the healthcare provider devices 120 can detect that a mouse 510 is navigated over a particular portion of the GUI. The healthcare provider devices 120 can detect activation of a right mouse button 520. In response, the patient management platform 150 can analyze the fields of the first GUI using the trained machine learning model. The trained machine learning model can generate or estimate one or more copy-paste operations to perform in association with the first GUI and/or one or more automated operations to perform in association with the first GUI.

The patient management platform 150 can instruct the healthcare provider devices 120 to generate a contextual menu 530 (e.g., to open the contextual menu). The healthcare provider devices 120 can present a prompt 540 over the first GUI that includes the one or more copy-paste operations and/or one or more automated operations to perform in association with the first GUI. Specifically, the prompt 540 can include a first region that displays different copy-paste operation options. Each copy-paste operation option that is displayed can include some information that identifies the data that is the subject of the corresponding copy-paste operation. For example, the information can identify the field of the GUI from which the data is obtained and/or the actual data itself or portion thereof. This allows the user to distinguishably determine which copy-paste operation to select. The prompt 540 can include a second region in which one or more automated operation options 544 are presented. These one or more automated operation options 544 can include a name of the corresponding operation that is performed in response to selection of the corresponding automated operation option.

In some examples, the healthcare provider devices 120 can detect that the mouse 510 has been moved to hover a cursor over an individual copy-paste option 542 in the prompt 540. In response, the healthcare provider devices 120 can present a highlight (or selection) or indicator 550 over the individual copy-paste option 542 and obtain metadata or information associated with the individual copy-paste option 542 that identifies which field of the first GUI is the subject of the individual copy-paste option 542. The healthcare provider devices 120 can automatically navigate a cursor in the first GUI 560 over the corresponding field. The healthcare provider devices 120 can change a visual attribute of the cursor to indicate visually the target of the individual copy-paste option 542. For example, the cursor can initially be presented as an arrow over a first region of the first GUI 560. Once the cursor is automatically moved to the region of the first GUI 560 corresponding to the field from which data will be copied, the cursor is changed to include a target icon. The healthcare provider devices 120 can receive input that activates the individual copy-paste option 542, such as after the individual copy-paste option 542 is highlighted (or selected) by the cursor. In response, the healthcare provider devices 120 can initiate the copy-paste operation to copy automatically the data from the field of the first GUI 560 to a target location (e.g., a field of another GUI, a field of a database, and/or another field of the same GUI).

In some cases, after the individual copy-paste option 542 is activated, the healthcare provider devices 120 can modify the one or more automated operation options 544 that are presented, such as based on the predetermined sequence shown in the block diagram 400. For example, the healthcare provider devices 120 can determine that the first copy-paste operation 412 was performed corresponding to the first sequence 410 based on selection of the individual copy-paste option 542. Namely, the healthcare provider devices 120 can determine that the first copy-paste operation 412 corresponds to the individual copy-paste option 542. In such cases, the healthcare provider devices 120 can modify the one or more automated operation options 544 to include the automation operation 414 and/or any other automation operations that are part of the first sequence 410.

In some examples, the healthcare provider devices 120 can automatically activate one or more of the one or more automated operation options 544 that are presented. The healthcare provider devices 120 can (in response to activating the automated options automatically or in response to user input) modifies a display attribute of the one or more automated operation options 544 that are presented. The display attribute can include a background color to represent the execution success state. For example, a green background color can indicate that the one or more automated operation options 544 can be activated successfully or has been activated successfully. A red background color can indicate failure in activation or execution of the corresponding one or more automated operation options 544. A yellow background can indicate that some manual user input may be needed to successfully execute the corresponding one or more automated operation options 544 that are presented.

Figure 6:
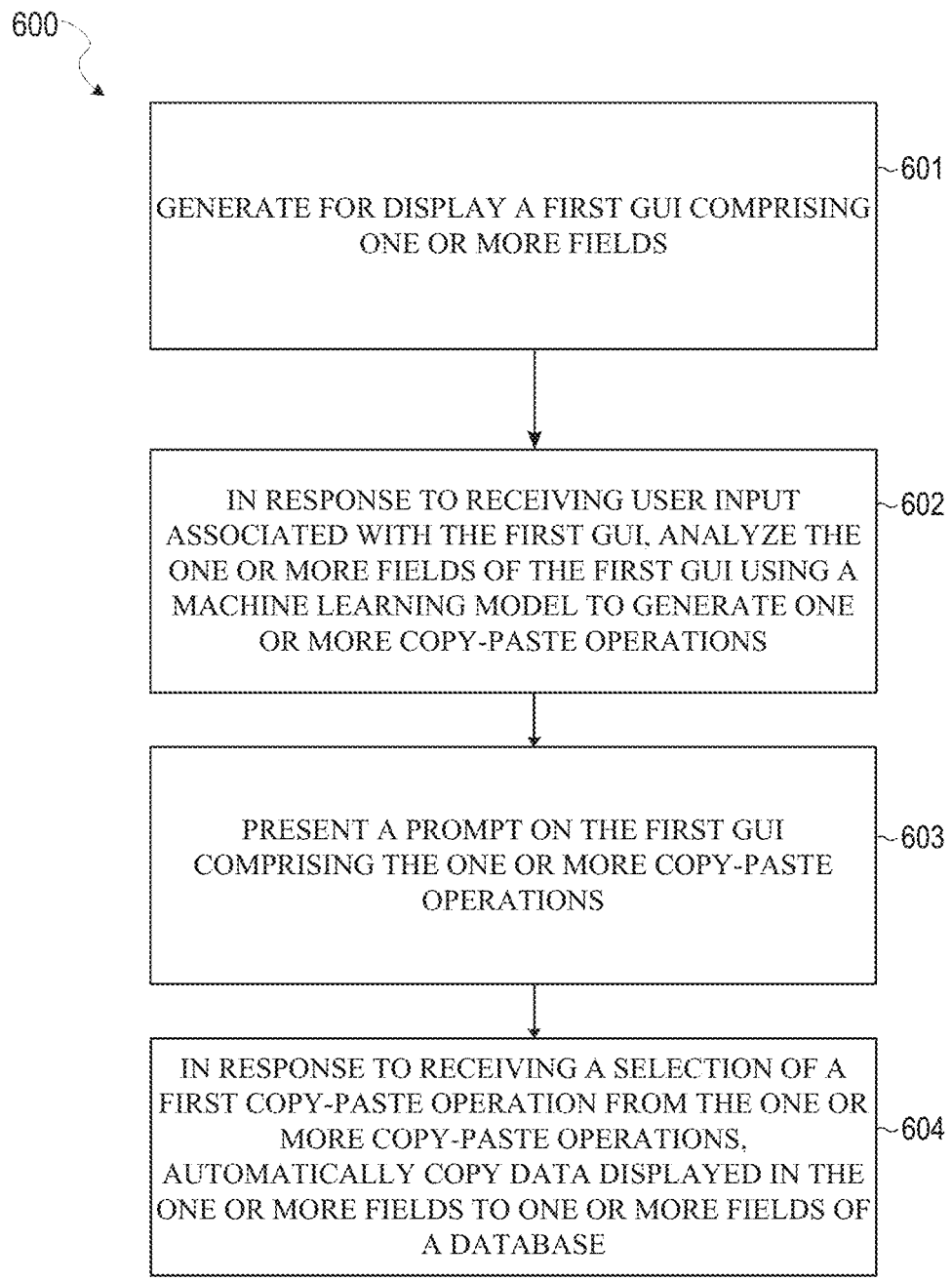
FIG. 6 is a flowchart illustrating example operations of the patient management platform, according to some examples.

FIG. 6 is a flowchart illustrating example operations and methods of the patient management platform 150 in performing a method or process 600, according to some examples. The process 600 may be embodied in computer-readable instructions for execution by one or more processors such that the operations of the process 600 may be performed in part or in whole by the functional components of the system 100; accordingly, the process 600 is described below by way of example with reference thereto. However, in other embodiments, at least some of the operations of the process 600 may be deployed on various other hardware configurations. Some or all of the operations of process 600 can be in parallel, out of order, or entirely omitted.

At operation 601, the system 100 generates for display a first graphical user interface (GUI) comprising one or more fields, as discussed above.

At operation 602, the system 100 receives user input associated with the first GUI, as discussed above.

At operation 603, the system 100, in response to receiving the user input, analyzes the one or more fields of the first GUI using a machine learning model to generate one or more copy-paste operations, as discussed above.

At operation 604, the system 100 presents a prompt on the first GUI comprising the one or more copy-paste operations, as discussed above.

At operation 605, the system 100, in response to receiving a selection of a first copy-paste operation from the one or more copy-paste operations, automatically copies data displayed in the one or more fields to one or more fields of a database, as discussed above.

Figure 7:
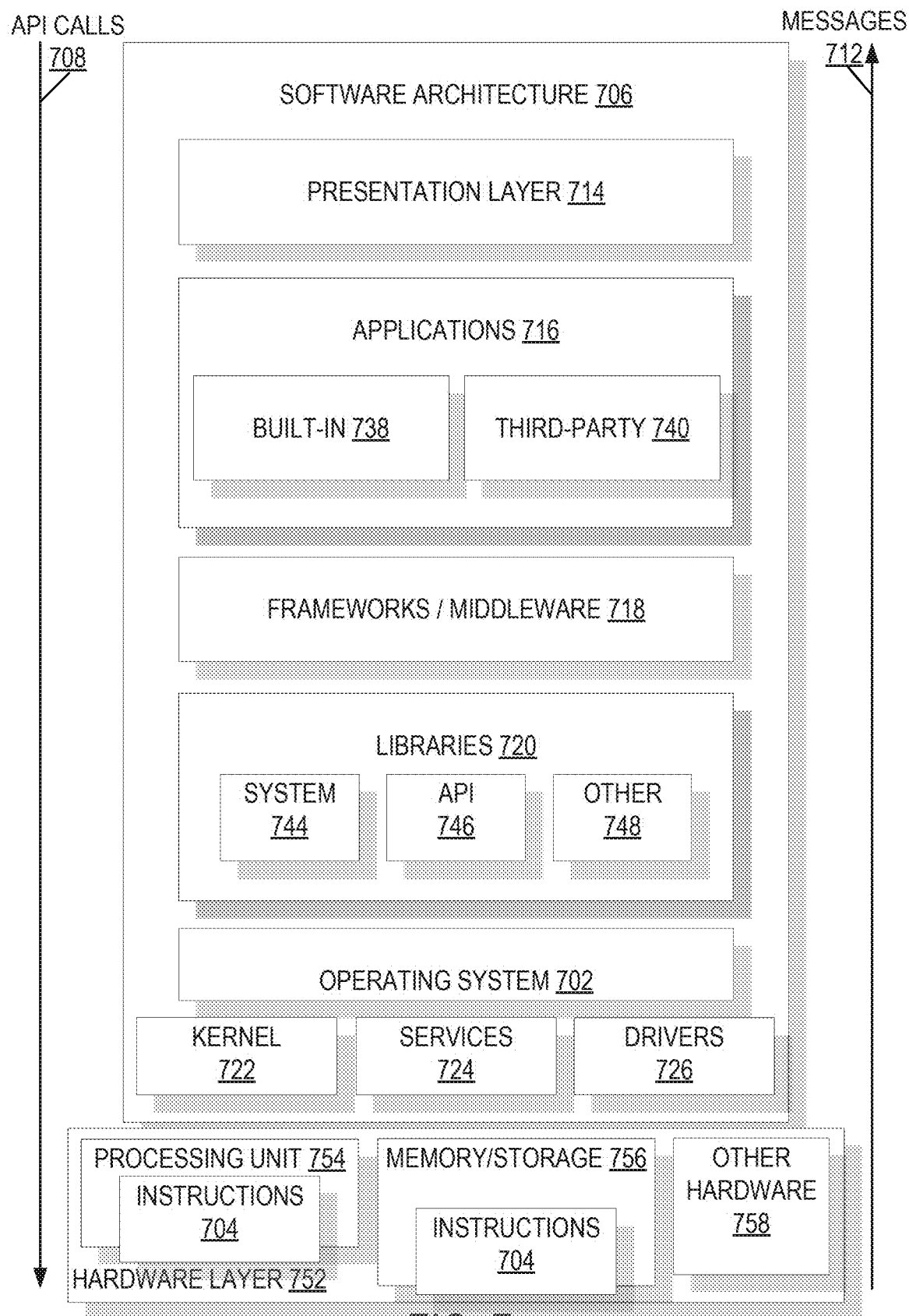
FIG. 7 is a block diagram illustrating an example software architecture, which may be used in conjunction with various hardware architectures herein described.

FIG. 7 is a block diagram illustrating an example software architecture 706, which may be used in conjunction with various hardware architectures herein described. FIG. 7 is a non-limiting example of a software architecture and it will be appreciated that many other architectures may be implemented to facilitate the functionality described herein. The software architecture 706 may execute on hardware such as machine 800 of FIG. 8 that includes, among other things, processors 804, memory 814, and input/output (I/O) components 818. A representative hardware layer 752 is illustrated and can represent, for example, the machine 800 of FIG. 8. The representative hardware layer 752 includes a processing unit 754 having associated executable instructions 704. Executable instructions 704 represent the executable instructions of the software architecture 706, including implementation of the methods, components, and so forth described herein. The hardware layer 752 also includes memory and/or storage devices memory/storage 756, which also have executable instructions 704. The hardware layer 752 may also comprise other hardware 758. The software architecture 706 may be deployed in any one or more of the components shown in FIG. 1. The software architecture 706 can be utilized to apply a machine learning technique or model to generate a prediction of one or more copy-paste operations to perform in association with one or more GUIs.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke API calls 708 through the software stack and receive messages 712 in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724 and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/devices.

The frameworks/middleware 718 (also sometimes referred to as middleware) provide a higher-level common infrastructure that may be used by the applications 716 and/or other software components/devices. For example, the frameworks/middleware 718 may provide various graphic user interface functions, high-level resource management, high-level location services, and so forth. The frameworks/middleware 718 may provide a broad spectrum of other APIs that may be utilized by the applications 716 and/or other software components/devices, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. Third-party applications 740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as operating system 702) to facilitate functionality described herein.

The applications 716 may use built-in operating system functions (e.g., kernel 722, services 724, and/or drivers 726), libraries 720, and frameworks/middleware 718 to create UIs to interact with users of the system. Alternatively, or additionally, in some systems, interactions with a user may occur through a presentation layer, such as presentation layer 714. In these systems, the application/component "logic" can be separated from the aspects of the application/component that interact with a user.

Figure 8:
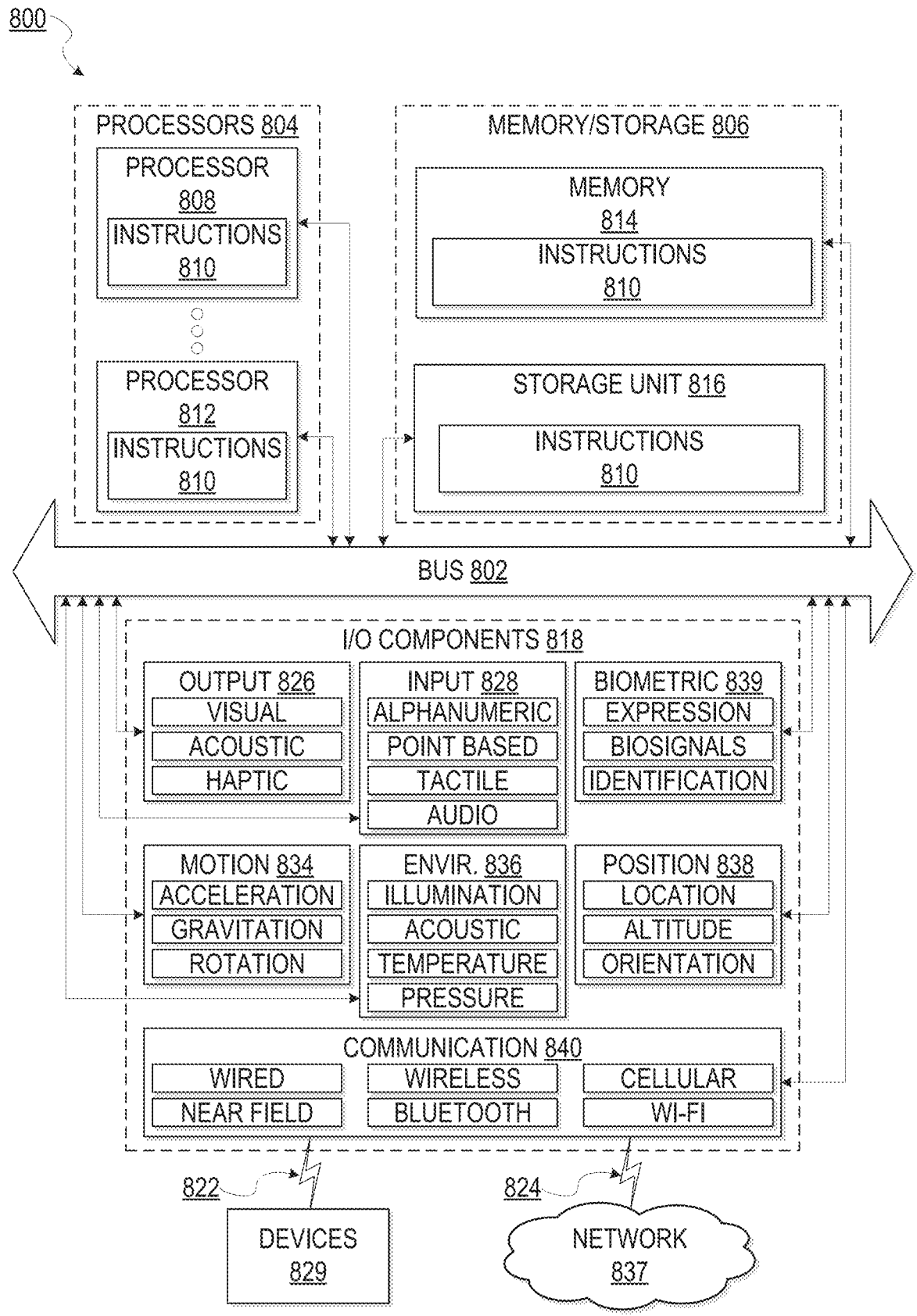
FIG. 8 is a block diagram illustrating components of a machine, according to some examples.

FIG. 8 is a block diagram illustrating components of a machine 800, according to some examples, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. For example, the instructions 810 may be executed by the system 100 to process fields of a GUI being accessed by the patient management platform 150 with a trained machine learning model to predict one or more copy-paste operations to perform in association with the fields of the GUI.

As such, the instructions 810 may be used to implement devices or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to a server computer, a client computer, a personal computer (PC), a tablet computer, a laptop computer, a netbook, a STB, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory/storage 806, and I/O components 818, which may be configured to communicate with each other such as via a bus 802. In an example embodiment, the processors 804 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 808 and a processor 812 that may execute the instructions 810. The term "processor" is intended to include multi-core processors 804 that may comprise two or more independent processors (sometimes referred to as "cores") that may execute instructions contemporaneously. Although FIG. 8 shows multiple processors 804, the machine 800 may include a single processor with a single core, a single processor with multiple cores (e.g., a multi-core processor), multiple processors with a single core, multiple processors with multiple cores, or any combination thereof.

The memory/storage 806 may include a memory 814, such as a main memory, or other memory storage, database 152, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further examples, the I/O components 818 may include biometric components 839, motion components 834, environmental components 836, or position components 838 among a wide array of other components. For example, the biometric components 839 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 837 or devices 829 via coupling 824 and coupling 822, respectively. For example, the communication components 840 may include a network interface component or other suitable device to interface with the network 837. In further examples, communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 829 may be another machine or any of a wide variety of peripheral devices (e.g., a peripheral device coupled via a USB).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as location via Internet Protocol (IP) geo-location, location via Wi-Fi® signal triangulation, location via detecting a NFC beacon signal that may indicate a particular location, and so forth.

Figure 9:
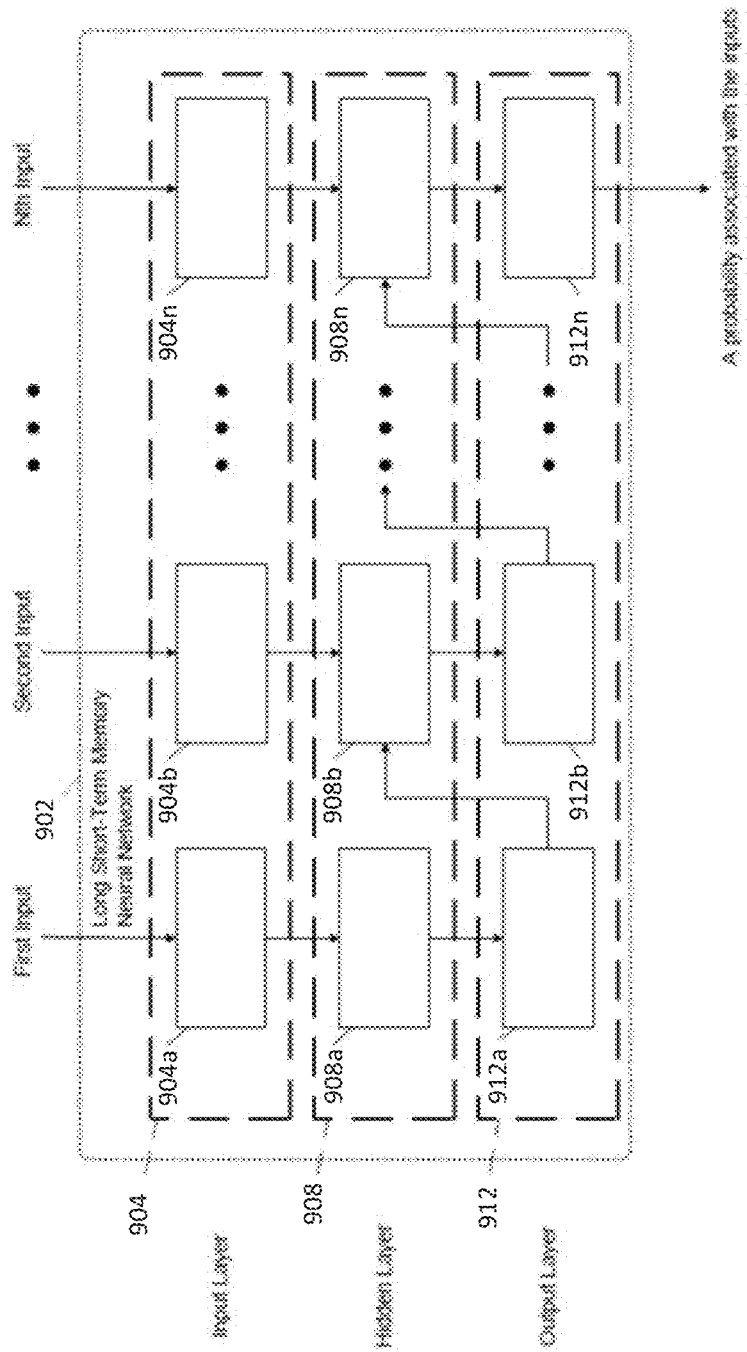
FIG. 9 is a functional block diagram of an example neural network that can be used for the inference engine or other functions (e.g., engines) as described herein to produce a predictive model.

FIG. 9 is a functional block diagram of an example neural network 902 that can be used for the inference engine or other functions (e.g., engines) as described herein to produce a predictive model. The predictive model can identify or generate a prediction of one or more copy-paste operations to perform in association with one or more GUIs presented to an operator or user. In an example, the neural network 902 can be a LSTM neural network. In an example, the neural network 902 can be a recurrent neural network (RNN). The example neural network 902 may be used to implement the machine learning as described herein, and various implementations may use other types of machine learning networks. The neural network 902 includes an input layer 904, a hidden layer 908, and an output layer 912. The input layer 904 includes inputs 904a, 904b . . . 904n. The hidden layer 908 includes neurons 908a, 908b . . . 908n. The output layer 912 includes outputs 912a, 912b . . . 912n.

Each neuron of the hidden layer 908 receives an input from the input layer 904 and outputs a value to the corresponding output in the output layer 912. For example, the neuron 908a receives an input from the input 904a and outputs a value to the output 912a. Each neuron, other than the neuron 908a, also receives an output of a previous neuron as an input. For example, the neuron 908b receives inputs from the input 904b and the output 912a. In this way the output of each neuron is fed forward to the next neuron in the hidden layer 908. The last output 912n in the output layer 912 outputs a probability associated with the inputs 904a-904n. Although the input layer 904, the hidden layer 908, and the output layer 912 are depicted as each including three elements, each layer may contain any number of elements. Neurons can include one or more adjustable parameters, weights, rules, criteria, or the like.

In various implementations, each layer of the neural network 902 must include the same number of elements as each of the other layers of the neural network 902. For example, training GUI features (e.g., fields of a GUI presented to an operator) may be processed to create the inputs 904a-904n. The neural network 902 may implement a model to produce one or more copy-paste operations to perform in association with the GUI features. More specifically, the inputs 904a-904n can include fields of the GUI as data features (binary, vectors, factors or the like) stored in the storage device 110. The fields of the GUI as data features can be provided to neurons 908a-908n for analysis and connections between the known facts. The neurons 908a-908n, upon finding connections, provides the potential connections as outputs to the output layer 912, which determines a list of copy-paste operations to perform in association with the fields of the GUI.

The neural network 902 can perform any of the above calculations. The output of the neural network 902 can be used to trigger display of a prompt that includes the list of copy-paste operations to an operator or patient in a GUI. For example, the prompt (e.g., notification) can be provided to a PBM, health plan manager, pharmacy, physician, caregiver, and/or a patient.

In some examples, a convolutional neural network may be implemented. Similar to neural networks, convolutional neural networks include an input layer, a hidden layer, and an output layer. However, in a convolutional neural network, the output layer includes one fewer output than the number of neurons in the hidden layer and each neuron is connected to each output. Additionally, each input in the input layer is connected to each neuron in the hidden layer. In other words, input 904a is connected to each of neurons 908a, 908b . . . 908n.

Glossary:

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols. The instructions can carry a selected model that automatically copy text from a first interface and automatically identifies a target location in a second interface at which the copied data from the first interface is suggested to be copied.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra-book, netbook, laptop, multi-processor system, microprocessor-based or programmable consumer electronics, game console, set-top box, or any other communication device that a user may use to access a network. In an example embodiment, the client device is capable of having two or more display that can have two or more interfaces, from which the system selects information to copy and a target location to insert the copied information on two different interfaces. In an example embodiment, the first interface is different than the second interface. The first interface can be produced a different program than the second interface. The first interface can be operating on a different database than the second interface.

"COMMUNICATIONS NETWORK" in this context refers to one or more portions of a network that may be an ad hoc network, an intranet, an extranet, a virtual private network (VPN), a LAN, a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes transient signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

While many of the examples used to describe the methods and systems are directed to healthcare or patient information displayed on one interface that is wither automatically selected for a copy function or automatically suggested for a paste function at a different location (e.g., input field) on a same interface or different interface, e.g., based on the physical location of the information or fields containing the information (regardless of the information), the present disclosure includes examples where the information is not healthcare or patient information. The fields on the interface can contain financial information, scientific information, social media information, combinations thereof or the like. For example, some banking information may be separate from investment information. A user may log into the banking database and be presented with a banking interface. A user may log into the investment database and be presented an investment database. The user may have a third interface where the user consolidates the banking information, e.g., checking account and saving account data, with the investment account information, e.g., stocks, mutual fund, retirement account. The banking interface and the retirement account interface displays the data in the same fields and the data is pated to a same location in the third interface. The same location can be a same row in a spreadsheet program or a same entry location in financial software. The present method and system learn where the physical locations of the fields are in the respective interfaces, which can be in different programs or different applications, and automatically copy and suggest a paste with the automatically copied data as described herein.

Changes and modifications may be made to the disclosed techniques without departing from the scope of the present disclosure. These and other changes or modifications are intended to be included within the scope of the present disclosure, as expressed in the following claims.

The Abstract of the Disclosure is provided to comply with 37 C.F.R. § 1.72 (b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A method comprising:
   generating for display a first graphical user interface (GUI) comprising one or more fields;
   receiving user input associated with the first GUI;
   in response to receiving the user input, analyzing the one or more fields of the first GUI using a machine learning model to generate one or more copy-paste operations, wherein the machine learning model comprises a neural network, and wherein the machine learning model is trained to establish a relationship between a plurality of training GUIs and ground-truth copy-paste operations performed in association with the training GUIs;
   presenting a prompt on the first GUI comprising the one or more copy-paste operations;
   in response to receiving a selection of a first copy-paste operation from the one or more copy-paste operations, automatically copying data displayed in the one or more fields to one or more fields of a database; and
   training the machine learning model by performing training operations comprising:
      obtaining a batch of training data comprising a first set of the plurality of training GUIs associated with a first set of ground-truth copy-paste operations performed in association with the first set of the plurality of training GUIs;
      processing the first set of the plurality of training GUIs by the machine learning model to generate an estimated set of copy-paste operations;
      computing a loss based on a deviation between the estimated set of copy-paste operations and the first set of ground-truth copy-paste operations; and
      updating one or more parameters of the machine learning model based on the computed loss.

2. The method of claim 1, further comprising:
   generating for display a second GUI comprising an individual field associated with the one or more fields of the database to which the data has been copied; and
   automatically populating the individual field of the second GUI with the data displayed in the one or more fields of the first GUI.

3. The method of claim 1, further comprising:
in response to receiving the selection of the first copy-paste operation, automatically copying the data displayed in a first of the one or more fields of the first GUI to automatically populate a second field of the one or more fields of the first GUI.

4. The method of claim 1, wherein the selection of the first copy-paste operation comprises activation of a single displayed option associated with the first copy-paste operation.

5. The method of claim 1, wherein the user input comprises activation of a right mouse button.

6. The method of claim 1, wherein the prompt comprises a plurality of copy-paste options each associated with a respective one of a plurality of copy-paste operations comprising the one or more copy-paste operations.

7. The method of claim 6, further comprising:
receiving first input that causes a first copy-paste option of the plurality of copy-paste options to be selected; and
in response to receiving the first input, visually indicating a first field of the one or more fields of the first GUI from which target data is copied and pasted as a result of additional input that selects the first copy-paste option.

8. The method of claim 7, further comprising:
receiving second input that causes a second copy-paste option of the plurality of copy-paste options to be selected; and
in response to receiving the second input after the first input, visually indicating a second field of the one or more fields of the first GUI instead of the first field, the second field being visually indicated to specify alternative target data to be copied and pasted as a result of additional input that selects the second copy-paste option.

9. The method of claim 7, wherein visually indicating the first field comprises replacing a cursor icon with a target icon over a region of the first GUI in which the target data of the first field is presented.

10. The method of claim 7, further comprising:
receiving the additional input that selects the first copy-paste option; and
in response to receiving the additional input, modifying a display attribute of the first copy-paste option to indicate whether the copy-paste operation associated with the first copy-paste option was successfully automatically performed.

11. The method of claim 10, wherein a color of the first copy-paste option is set to a first color in response to determining that the copy-paste operation associated with the first copy-paste option was successfully automatically performed, and wherein the color of the first copy-paste option is set to a second color in response to determining that the copy-paste operation associated with the first copy-paste option was unsuccessfully automatically performed.

12. The method of claim 1, further comprising:
generating one or more context sensitive automation operations associated with the one or more fields; and
presenting one or more automation operation options associated with the one or more context sensitive automation operations together with the one or more copy-paste operations in the prompt.

13. The method of claim 12, wherein the one or more context sensitive automation operations are generated based on the first copy-paste operation that is selected.

14. The method of claim 12, further comprising:
activating a first of the one or more context sensitive automation in response to receiving input that selects a corresponding first of the one or more automation operation options; and
presenting a visual indicator representing a result of performing the first of the one or more context sensitive automation in the corresponding first of the one or more automation operation options.

15. The method of claim 12, wherein the one or more context sensitive automation operations comprise at least one of a compare text of two fields operation, a mathematical computation operation for data in the one or more fields of the first GUI, or verifying visual contents of the first GUI.

16. The method of claim 1, wherein the one or more fields comprise at least one of patient information, an electronic health record, past claims information for the patient, patient health information, past medical recommendations, past treatment recommendations, patient demographic information, prior bloodwork results, prior results of non-bloodwork tests, medical history, medical provider notes in the electronic health record, intake forms completed by the patient, patient in-network insurance coverage, patient out-of-network insurance coverage, patient location, or one or more treatment preferences.

17. The method of claim 1, wherein a subset of the first set of ground-truth copy-paste operations is generated in response to detecting a predetermined sequence of user performed copy-paste actions, the predetermined sequence of user performed copy-paste actions comprising selecting a portion of one of the training GUIs, activating a first copy operation, identifying a target portion of one of the training GUIs, and activating a paste operation.

18. A system comprising:
one or more processors coupled to a memory comprising non-transitory computer instructions that when executed by the one or more processors perform operations comprising:
generating for display a first graphical user interface (GUI) comprising one or more fields;
receiving user input associated with the first GUI;
in response to receiving the user input, analyzing the one or more fields of the first GUI using a machine learning model to generate one or more copy-paste operations, wherein the machine learning model comprises a neural network, and wherein the machine learning model is trained to establish a relationship between a plurality of training GUIs and ground-truth copy-paste operations performed in association with the training GUIs;
presenting a prompt on the first GUI comprising the one or more copy-paste operations;
in response to receiving a selection of a first copy-paste operation from the one or more copy-paste operations, automatically copying data displayed in the one or more fields to one or more fields of a database; and
training the machine learning model by performing training operations comprising:
obtaining a batch of training data comprising a first set of the plurality of training GUIs associated with a first set of ground-truth copy-paste operations performed in association with the first set of the plurality of training GUIs;
processing the first set of the plurality of training GUIs by the machine learning model to generate an estimated set of copy-paste operations;

computing a loss based on a deviation between the estimated set of copy-paste operations and the first set of ground-truth copy-paste operations; and updating one or more parameters of the machine learning model based on the computed loss.

19. The system of claim 18, wherein the one or more processors further perform operations comprising:

generating for display a second GUI comprising an individual field associated with one or more fields of the database to which the data has been copied;

automatically populating the individual field of the second GUI with the data displayed in the one or more fields of the first GUI; and in response to receiving the selection of the first copy-paste operation, automatically copying the data displayed in a first of the one or more fields of the first GUI to automatically populate a second field of the one or more fields of the first GUI.

20. A non-transitory computer readable medium comprising non-transitory computer-readable instructions for performing operations comprising:

generating for display a first graphical user interface (GUI) comprising one or more fields;

receiving user input associated with the first GUI;

in response to receiving the user input, analyzing the one or more fields of the first GUI using a machine learning model to generate one or more copy-paste operations, wherein the machine learning model comprises a neural network, and wherein the machine learning model is trained to establish a relationship between a plurality of training GUIs and ground-truth copy-paste operations performed in association with the training GUIs;

presenting a prompt on the first GUI comprising the one or more copy-paste operations;

in response to receiving a selection of a first copy-paste operation from the one or more copy-paste operations, automatically copying data displayed in the one or more fields to one or more fields of a database; and training the machine learning model by performing training operations comprising:

obtaining a batch of training data comprising a first set of the plurality of training GUIs associated with a first set of ground-truth copy-paste operations performed in association with the first set of the plurality of training GUIs;

processing the first set of the plurality of training GUIs by the machine learning model to generate an estimated set of copy-paste operations;

computing a loss based on a deviation between the estimated set of copy-paste operations and the first set of ground-truth copy-paste operations; and updating one or more parameters of the machine learning model based on the computed loss.

* * * * *